March 27, 1956  A. C. PURPURA  2,739,524
TIMING MECHANISM FOR A COOKING VESSEL
Filed April 20, 1953
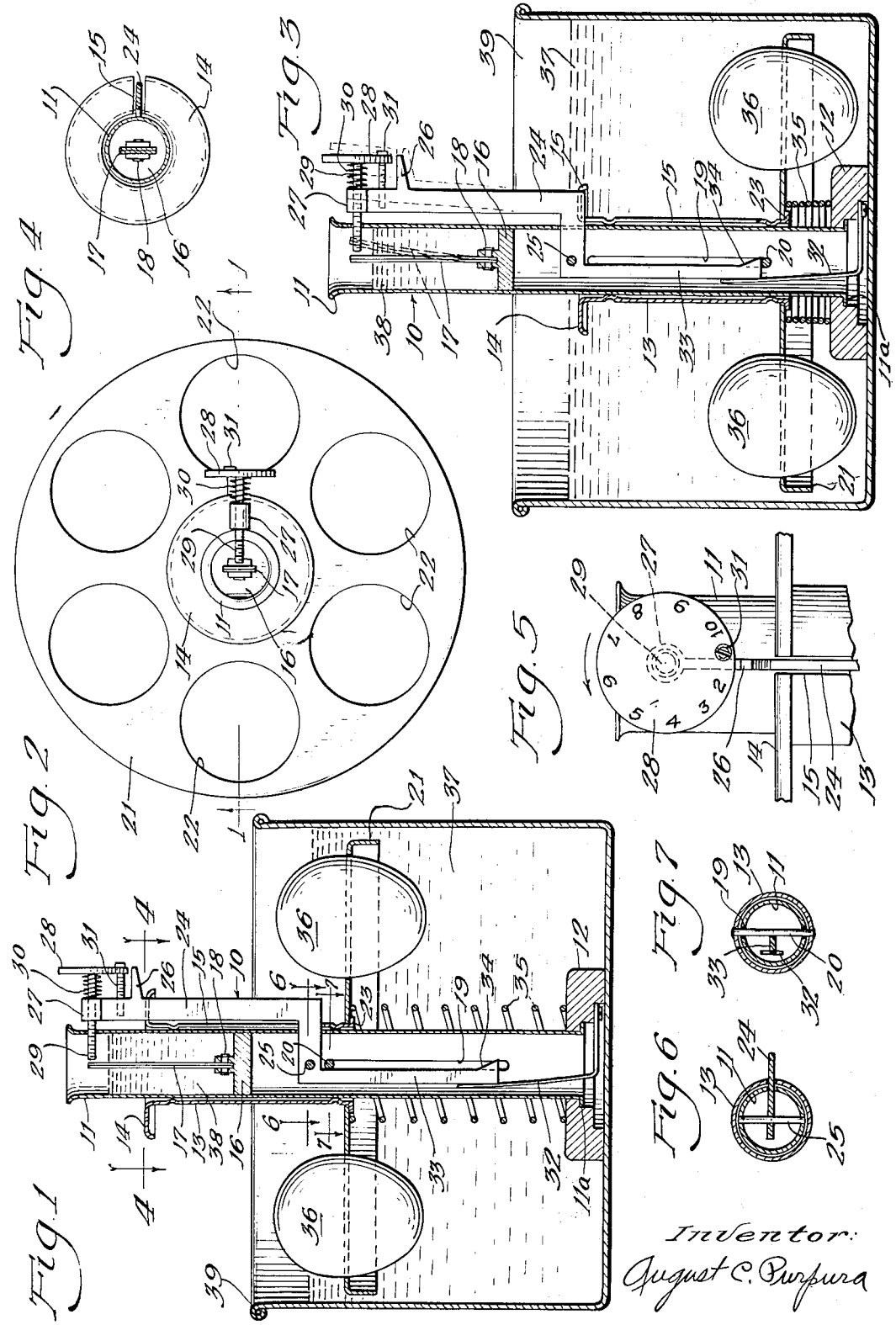
Inventor:
August C. Purpura

United States Patent Office 2,739,524
Patented Mar. 27, 1956

2,739,524

TIMING MECHANISM FOR A COOKING VESSEL

August C. Purpura, Berwyn, Ill.

Application April 20, 1953, Serial No. 349,856

6 Claims. (Cl. 99—336)

The present invention relates to a cooking appliance for boiling eggs or the like and for popping up the eggs out of the water after the cooking operation is completed.

The invention can also be used for boiling frankfurters, deep fat frying and for warming baby milk bottles and other food that is cooked by boiling water or oil.

An object of the invention is to provide a cooking appliance which will operate with unerring efficiency.

Another object of the invention is to provide a timing unit which can be used to convert any conventional pot or pan into an automatic pop-up cooking appliance when the pot or pan is placed on any conventional gas or electric heated kitchen range.

My invention also aims to provide a cooking timer having a novel thermal timing mechanism. Heretofore, egg boilers were controlled by a bimetal strip which terminated the boiling operation when said water which did the cooking had reached a pre-determined temperature.

I have found that more accurate timing can be obtained by having a separate water container and having a bimetal strip mounted therein and then placing this thermal timer container in a cooking vessel partially filled with water for boiling eggs or the like, thus the water in the thermal timer container is subjected to the same heat treatment as the article being cooked. It is therefore possible to time the cooking operation by terminating the cooking when the water in the thermal timer container has reached a predetermined temperature.

The principle on which my invention operates is based on the fact that there is a certain time lag when heating a separate thermal timer water container by the water which is used for the cooking operation.

I have found that it takes approximately two (2) minutes after the water in the cooking vessel begins to boil to bring the temperature of the water in the thermal container to 130 degrees Fahrenheit and approximately an additional minute for every additional 10 degree rise in temperature. It can be readily seen that a maximum timing period of ten (10) minutes can be easily obtained and with the manual adjusting screw engaging the bimetal strip, any timing period can be obtained by turning this adjusting screw which is properly indicated in minutes to conform with the above operating cycle. It can therefore be seen that a simple and very accurate and variable timing period can be obtained from my invention.

The various features of novelty whereby my invention is characterized will hereinafter be pointed out with particularity in the claims; but for a full understanding of the invention and of its various objects and advantages, including those just enumerated, reference may be had to the following detailed description taken in connection with the accompanying drawing.

Referring to the drawing:

Fig. 1 is a vertical sectional view taken on the line 1—1 of Fig. 2.

Fig. 2 is a plan view.

Fig. 3 is a view similar to Fig. 1 but showing the egg rack in its depressed position.

Fig. 4 is a plan section taken on the line 4—4 of Fig. 1.

Fig. 5 is a fragmentary view in elevation of mechanism shown in Fig. 1.

Fig. 6 is a section taken on the line 6—6 of Fig. 1.

Fig. 7 is a section taken on the line 7—7 of Fig. 1.

For purposes of illustration I have shown by invention as it appears when it is placed in a conventional cooking vessel or pan shown as part No. 39 in drawings.

My invention consists of a tube 11 mounted on a suitable base 12, the tube is secured to the base by flaring over the bottom edge of the tube shown at 11A. There is an outer sleeve 13 having its top edge flared over to form a flange 14 which is used as a handle for depressing the egg rack 21, the egg rack 21 is fastened to the sleeve 13 at the bottom end by flaring over the sleeve edge 23 after the rack 21 has been pressed on the sleeve 13.

The rack 21 has suitable holes 22 for holding the eggs 36. A suitable coil spring 35 on the outside of the tube tends constantly to lift the egg rack upwardly. I have provided a latching lever 24 pivoted on a pin 25 as shown in Fig. 6. The pin is riveted on the tube 11, the lower portion of latching lever 24 is shown as 33 which operates inside of the tube 11, the bottom edge of latch 33 is made wider at its extreme end as shown at 34 so that it can easily latch the pin 20 fastened on the outer sleeve 13 which enters the centre of tube 11 through slots 19. I provide a small leaf spring 32 for holding the latch 33 in locking position.

The slot 15 prevents the sleeve 13 and flange 14 from interfering with the operation of the latch lever 24.

The tube 11 has its upper portion sealed by a pressed fit washer 16 having a slotted boss for mounting a bimetal strip 17 and fastened thereto with a rivet 18. This upper portion of the tube holds a small volume of water shown as 38. The upper portion of latch 24 has a threaded boss 27. In the boss 27 there is a threaded pin 29 having a knob 28 which has figures engraved thereon. The threaded pin 29, is moved by the deflection of the bimetal 17 in the direction to engage the pin 29 so that it will move the latch 24 far enough for its bottom edge 34 to release the pin 20 and permit the spring 35 to lift the rack 21.

By turning the knob 28 the gap or open space between the bimetal 17 and pin 29 may be varied; increasing the gap will require more deflection of the bimetal 17 which will require more heat and then consequently a longer timing period, the pitch of the thread of pin 29 is so calibrated to conform with the graduations on knob 28 as shown in Fig. 5. The operator merely turns the knob 28 until the desired time figure is directly opposite the indicator 26 on latch 24, the spring 30 holds the knob 28 in any position it is set. The stop pin 31 prevents the operator from turning the knob 28 more than one revolution.

The operation of the device is as follows:

My invention as-a-unit shown as 10 on the drawing, is placed in any suitable pan large enough to hold the unit such as pan No. 39, egg or eggs are then placed in the holes 22, the egg rack is depressed by pushing down the knob or flange 14 until it becomes locked by the latch end 34. The pan is then filled with water shown as 37 in drawings. Only enough water is used to reach the top of the eggs, when the egg rack is depressed. Then a small volume of water is used to fill the tube shown as 38 in the drawing.

Then the knob 28 is turned to the timing period desired and the pan 39 with its contents is placed on a source of heat, preferably a gas or electric kitchen range.

I do not know exactly how the heat is transmitted to body of water 38. Some is conducted from base 12 by tube 11. Tube 11 is also heated by the main body of water 37. The lower end of tube 11 is filled with water to the level of that in the pan 39; and steam evolved from this column obviously transmits heat to tube 11. However, have found that it takes approximately two (2) minutes after the water in pan 39 begins to boil to bring the water in the top of tube 11 to 130 degrees Fahrenheit and an additional minute for each additional ten (10) degrees rise in the temperature of this same water, therefore when the timing period desired has elapsed the bimetal strip 17 will have reached the pre-determined position to release the egg rack and permit the spring 35 to lift the eggs out of the water and thus complete the cooking operation.

It is thought that the invention and its attendant advantages will be understood from the foregoing description and it will be apparent that various changes may be made in the form, construction and arrangement of the parts without departing from the spirit and scope of the invention or sacrificing any of its material advantages, the form hereinbefore described being merely a preferred embodiment thereof.

I claim as my invention:

1. An apparatus for supporting articles to be cooked and automatically regulating the length of the cooking period, comprising a base adapted to rest on the bottom of a vessel in which the cooking is to be done, a tall column rising from said base, a rack for supporting said articles mounted on and slidable up and down the column from a low level to a high level at which the articles are above the liquid in the vessel, the column having in the top a chamber the bottom of which is at a substantial distance above the rack, a heat-responsive element mounted on the column in position to contact liquid within said chamber, and means controlled by said element to cause the rack to rise to its upper level when the temperature of the liquid in said chamber rises to a predetermined point while the rack is at the lower level.

2. An apparatus as set forth in claim 1, wherein a compression spring surrounds the column below the rack and tends constantly to force the rack upward, a latch is movably mounted on the column in position to engage a part movable with the rack, to hold the rack down, and the latch has an upward extension reaching into the vicinity of the heat-responsive element for latch-tripping cooperation therewith.

3. An apparatus as set forth in claim 2, wherein the heat-responsive element is a bimetal strip anchored at one end to the column within the chamber in the top of the latter, and wherein the part of the latch that cooperates with said strip is separated from said element by a gap and is manually adjustable to vary the width of the gap.

4. An apparatus for supporting articles to be cooked and automatically regulating the length of the cooking period, comprising a base adapted to rest on the bottom of a vessel in which cooking is to be done, a tubular column rising from said base, a sleeve surrounding the column and slidable up and down on the same, an article-supporting rack fixed to the lower end of said sleeve, a spring surrounding the column below the rack and tending constantly to move the rack from a low level to a high level at which the articles thereon will be above the liquid in the vessel, said column extending well above said high level and having in the top a chamber for containing a small amount of liquid adapted to receive heat from the column, a heat-responsive element mounted on the column within said chamber, and means controlled by said element to cause the rack to move up when the liquid in the said chamber reaches a predetermined temperature during a cooking operation.

5. An apparatus as set forth in claim 4, wherein there is mounted within the column a rockable latch bar, a pin fixed to the sleeve and extending crosswise of the same through vertical slots in the column in position to be engaged by the lower end of the latch bar, and wherein the upper end of the bar extends to the top of the column and a part on the upper end of the bar extends toward the heat-responsive element and into such relation thereto as to cause the latter to exert a latch tripping force on the bar when the liquid in the chamber reaches a predetermined height.

6. An apparatus as set forth in claim 5, wherein the heat-responsive element is a bimetal strip anchored at one end to the column, and wherein there is an adjustable screw mounted on the upper end of the latch bar in position to be shifted from and toward the strip to create between them a gap of any desired width.

References Cited in the file of this patent

UNITED STATES PATENTS

| | | |
|---|---|---|
| 550,908 | Chevalie | Dec. 3, 1895 |
| 1,237,458 | Bennett | Aug. 21, 1917 |
| 1,397,620 | Clark | Nov. 22, 1921 |
| 1,501,412 | Ingram | July 15, 1924 |
| 1,551,128 | Williams | Aug. 25, 1925 |
| 1,732,321 | White | Oct. 22, 1929 |
| 1,753,740 | Chapin et al. | Apr. 8, 1930 |
| 2,158,133 | Lemp | May 16, 1939 |
| 2,292,853 | Wilcox | Aug. 11, 1942 |
| 2,342,108 | Appleman | Feb. 22, 1944 |
| 2,566,914 | Worst | Sept. 4, 1951 |
| 2,568,916 | Godefroy | Sept. 25, 1951 |
| 2,624,266 | Colburn et al. | Jan. 6, 1953 |

FOREIGN PATENTS

| | | |
|---|---|---|
| 119,735 | Austria | Nov. 10, 1930 |
| 335,730 | Great Britain | Oct. 2, 1930 |